United States Patent [19]

Fontaine

[11] 4,282,915
[45] Aug. 11, 1981

[54] PNEUMATIC TIRE

[75] Inventor: Jean F. L. Fontaine, Ingeldorf, Luxembourg

[73] Assignee: The Goodyear Tire & Rubber Company, Akron, Ohio

[21] Appl. No.: 123,134

[22] Filed: Feb. 21, 1980

[51] Int. Cl.³ ............................................. B60C 11/00
[52] U.S. Cl. ........................... 152/209 R; 152/354 R; D12/146
[58] Field of Search ........... 152/209 D, 209 B, 209 R, 152/209 NT, 209 WT, 352 R, 354 R, 354 RB; D12/136, 141, 146

[56] References Cited

U.S. PATENT DOCUMENTS

| | | | |
|---|---|---|---|
| 2,120,063 | 6/1938 | Bourdon | 152/209 R |
| 3,674,077 | 7/1972 | Verdier | 152/209 R |
| 3,971,424 | 7/1976 | Boileau | 152/209 R |
| 3,998,256 | 12/1976 | Verdier | 152/209 R |
| 4,055,209 | 10/1977 | Senger | 152/209 R |

Primary Examiner—John E. Kittle
Assistant Examiner—Thomas E. Bokan
Attorney, Agent, or Firm—Frank Pincelli

[57] ABSTRACT

A pneumatic tire wherein the tread portion comprises a plurality of independent projections arranged so as to provide a plurality of substantially axially extending grooves from the centerplane of the tire to the tread edge. The independent projections have a rigid portion and at least one flexible portion such that when a braking force is applied the flexible portion deforms so as to improve water drainage from the tread portion of the tire.

7 Claims, 4 Drawing Figures

PNEUMATIC TIRE

This invention relates to pneumatic tires, more particularly to a pneumatic tire having improved wet road performance.

BACKGROUND OF THE INVENTION

It is generally well-known that when a pneumatic tire is operated under wet road conditions, there is an increased danger that the tire will go out of control of the vehicle operator. Loss of control under wet road conditions generally occurs as a result of a reduced coefficient of friction between the tire and road surface. The presence of water in the tire footprint reduces the coefficient of friction between the tire and road surface. When the coefficient of friction between the tire and road surface is reduced, the amount of applied tangential force needed to cause slip is reduced. Additionally, when an excessive amount of water is present in the footprint of the tire, a portion of the tire in the footprint may be caused to lift from the road surface thereby further reducing the coefficient of friction between the tire and road surface. Further, when the excess amount of water present in the footprint of the tire reaches a certain value, the tire may be caused to ride upon a thin film of water, more commonly known as hydroplaning. It can be seen that the possibility of loss control is increased under wet road conditions. Furthermore, the possibility of loss of control of the vehicle is even further increased when a braking or accelerating force is applied to the tire. When a tire experiences a braking or accelerating force, the applied tangential force between the tire and road surface increases the possibility of slip. It is therefore desirable in designing a tire having good wet performance to remove water from the footprint of the tire as quickly and efficiently as possible.

SUMMARY OF THE INVENTION

Applicant has discovered a pneumatic tire having improved wet performance characteristics such that the braking and/or accelerating force that is applied to the tire is used to improve water removal from the footprint of the tire. The tread portion comprises a plurality of independent projections having a particular configuration and arranged about the circumference of the tire so as to provide a plurality of substantially axially extending grooves from the central area of the tire to the tread edge. The independent projections have a rigid portion and at least one flexible portion such that when a braking force is applied to the tire, the flexible portions of the independent projection contribute to improved water drainage from the footprint of the tire.

DETAILED DESCRIPTION OF THE INVENTION

Figure 1:
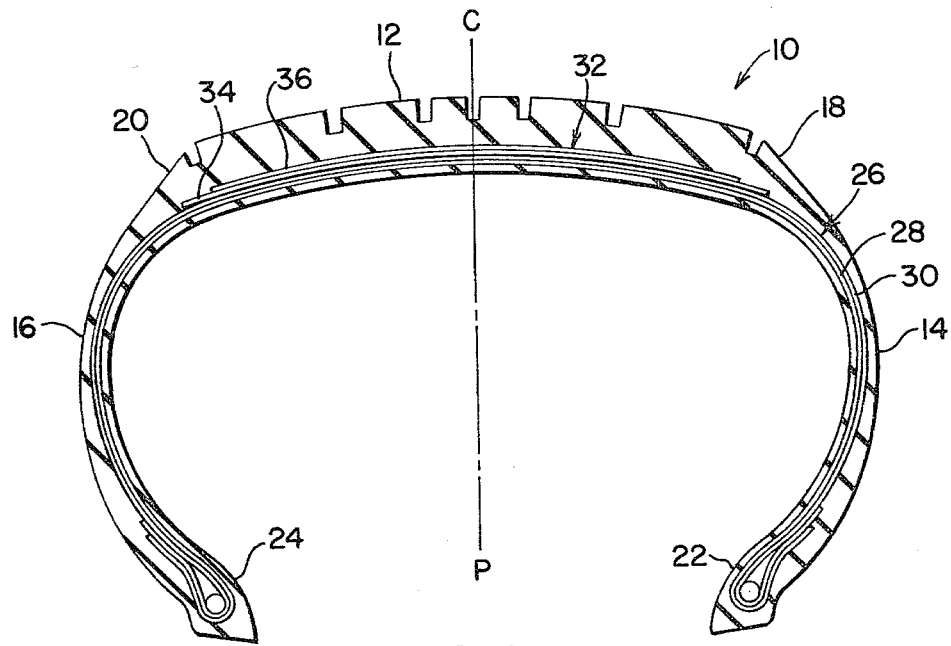
FIG. 1 is a radial cross-sectional view of a tire made in accordance with the present invention.
Figure 2:
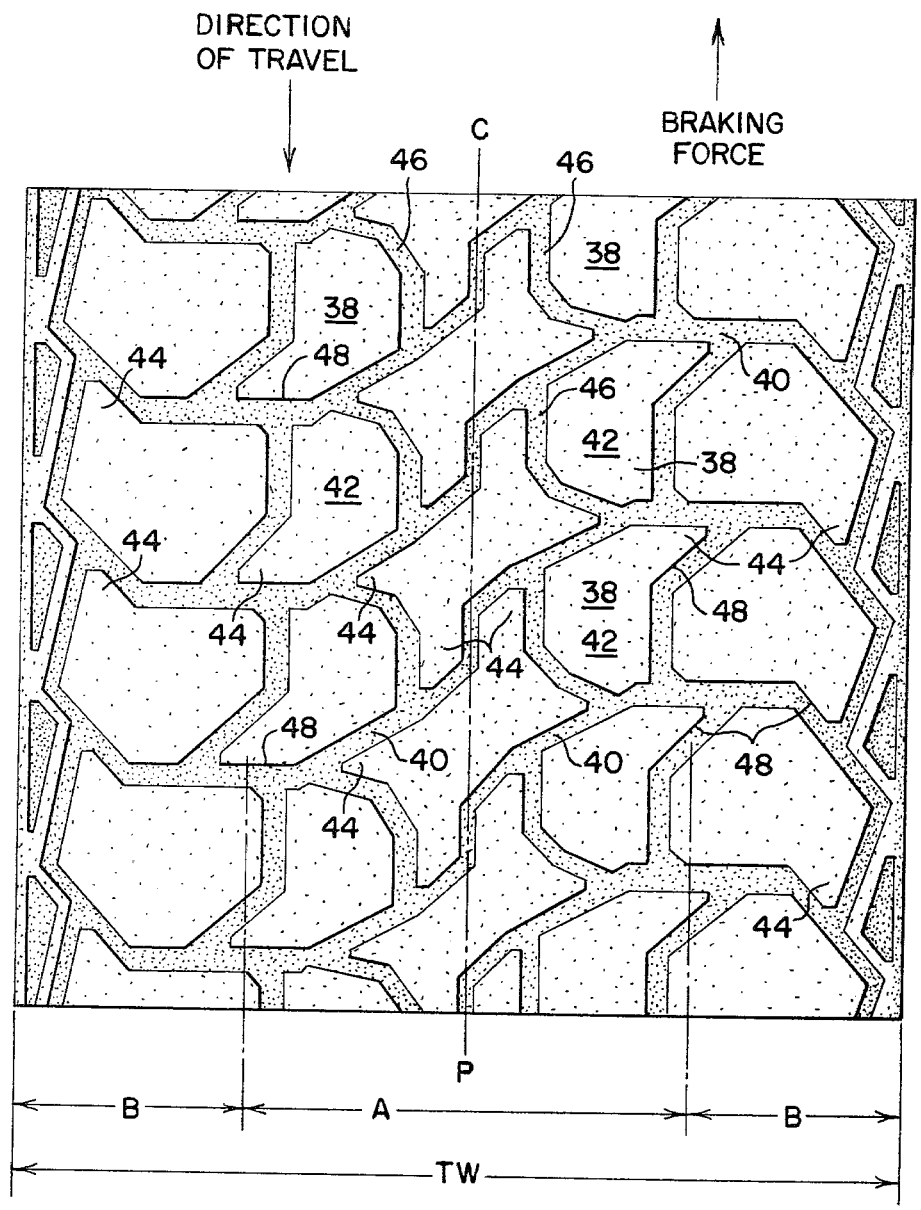
FIG. 2 is a fragmentary, enlarged front plan view of the tread portion of a tire made according to the present invention.

Referring to FIGS. 1 and 2, there is illustrated a tire 10 having a ground-engaging tread portion 12. A pair of sidewall portions 14, 16 extend from each of the shoulder portions 18, 20 of the tread portion 12 radially inward terminating in a pair of bead portions 22, 24 respectively. A carcass ply structure 26 extends from bead portion to bead portion. In the embodiment illustrated carcass ply structure 26 comprises of two ply layers 28, 30. Preferably the carcass ply structure is of the radial type construction wherein the cords of each carcass ply form an angle with respect to the mid-circumferential centerplane of the tire from about 75° to 90°. The cords of the carcass ply structure may comprise of any material normally used in cord reinforcements in pneumatic tires. For example, and not by way of limitation, nylon, rayon, polyester and steel. The tire 10 may be further provided with a belt reinforcing ply structure 32 beneath the tread portion and radially outward of the carcass ply structure and may be of any construction desired. In the embodiment illustrated belt reinforcing ply structure 32 comprises of two cut belt layers 34, 36 the cords of which (not shown) lie at an angle of in the range from about 15° to 25°, preferably about 18° with respect to the mid-circumferential centerplane CP. The cords of the belt ply structure may comprise of any conventional material normally used in belt reinforcements any may lie at any conventional angle used in pneumatic tires.

In the embodiment illustrated in FIGS. 1 and 2, the tread portion 12 of the tire 10 is provided with a plurality of independent projections 38 arranged about the circumference of the tire so as to provide a plurality of substantially axially extending grooves 40 which extend from about the mid-circumferential centerplane CP of the tire to the tread edge. The grooves 40 in the central portion A of the tread forms an angle with respect to the mid-circumferential centerplane less than or equal to the angle formed by the grooves 40 in the lateral portions B of the tread. For the purposes of this invention, the central portion A is defined as that area of the tire which extends circumferentially about the tire and extends axially outward on both sides of the mid-circumferential centerplane CP a distance from the mid-circumferential centerplane of approximately 60 percent of the distance from the mid-circumferential centerplane CP toward the tread edge, preferably about 65 percent, and the lateral portions B of the tread are defined as that portion of the tread which extends circumferentially about the tire and extends the lateral edges of the central portion A to the tread edge of the tire. Preferably, the grooves 40 in the central portion A form an angle in the range of about 30° to 80° and the grooves 40 in the lateral portions B form an angle from about 60° to 90°. In the embodiment illustrated the grooves 40 form an angle in the central portion A of about 45° and in the lateral portions B of about 90°.

The independent projections 38 have a configuration such that when a braking or accelerating force is experienced by the projections 38, the projections deform so as to improve water drainage from the footprint of the tire through grooves 40. The projections 38 in the central portion A of the tire are provided with a rigid central portion 42 and at least one flexible portion 44 which is generally three to four times more flexible than the rigid portion 42. The flexible portion 44 distorts a significant amount in the direction of the braking or accelerating force whereas the rigid portions do not distort appreciably. The flexible portions 44, when distorted open the grooves so as to allow for improved water drainage from the footprint of the tire and tend to close grooves 46 which channel water back into the footprint of the tire. The flexible portions 44 are oriented such that the water in the footprint of the tire will tend to flow toward the closest respective tread edge and not axially into the tread portion. This minimizes the water drainage across the mid-circumferential centerplane CP thereby improving the efficiency of water drainage from the footprint by minimizing the time it takes for the water to leave the footprint. Additionally, the structured channeling of water provides for uniform distribution of water in the footprint of the tire.

The flexible portions 44 which are located adjacent the mid-circumferential centerplane CP of the tire are oriented so that the water in this area may travel in either axial direction, depending upon the direction of travel.

Figure 3:
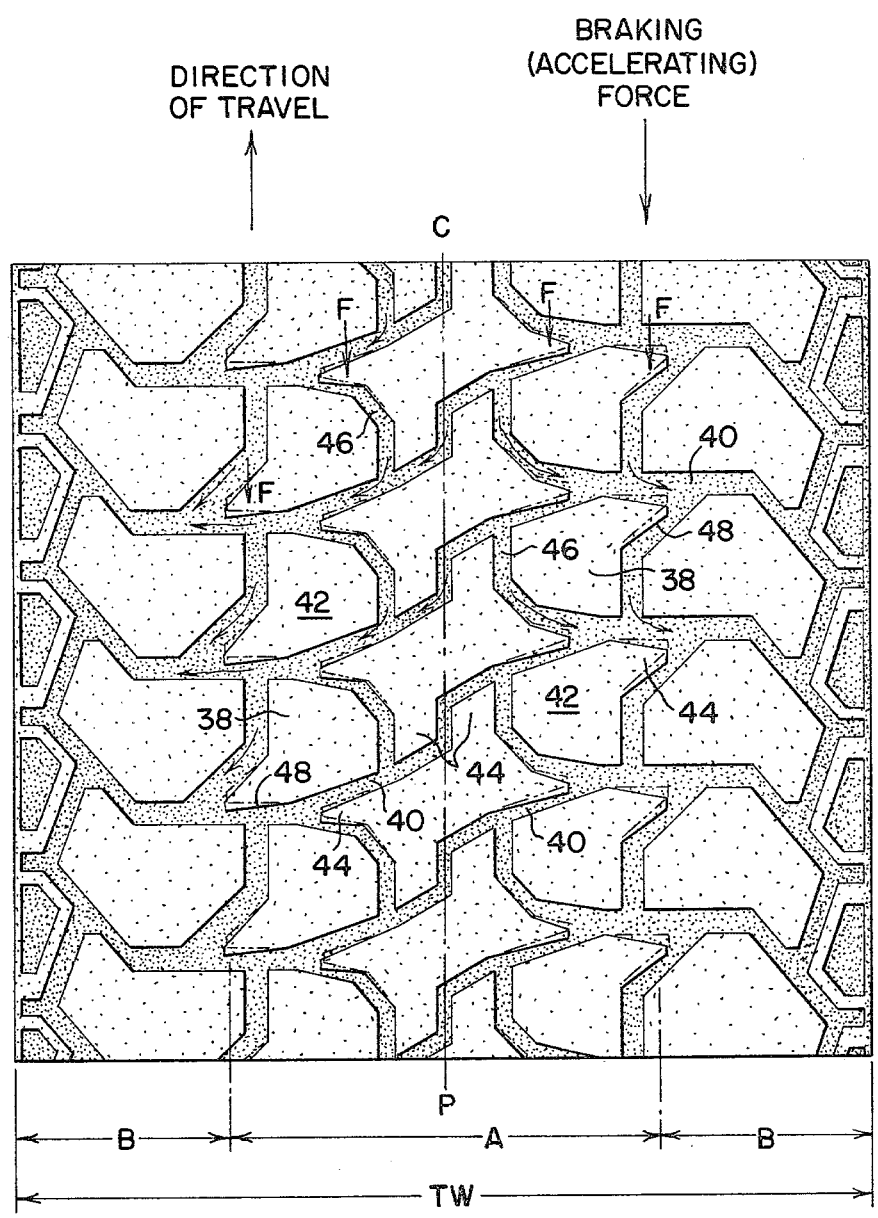
FIG. 3 is a fragmentary, enlarged front plan view of the deformed tread portion of FIG. 2 when a braking force is applied.

Referring to FIG. 3, there is illustrated the effects of a braking force upon the projection 38 and the direction of water flow in the footprint. It is to be understood that the direction of flow of the water in the footprint of the tire when the tire is undergoing an accelerating force or braking force is the same. The arrows indicate the direction of travel and the braking force being applied to the tire. When a braking force is applied, the flexible portions 44 of independent projections 38 deform in the direction of the braking force. The solid lines indicate the shape of the projections as deformed and the dash lines indicate the projections when no braking or accelerating force is being applied. This deformation minimizes the flow of water in grooves 46 while channeling water into grooves 40 from the central portion of the tread axially outward. Additionally, the deformation provides additional void area for flow of water. It is understood that as increased braking force is applied to the tire, the greater the flexible portions 44 will be deformed, thereby further increasing the water drainage efficiency of the tire.

The amount of flexibility of flexible portions 44 is dependent upon its configuration and the material from which it is made. Therefore, the amount of flexibility can be varied for each particular tire as desired.

In the particular embodiment illustrated, the flexible portions have a forward engaging surface 48. For the purposes of this invention, the forward engaging surface 48 is the vertical surface of the flexible portion 44 which first contacts the road surface. The higher the angle between the surface 48 and the mid-circumferential centerplane CP the greater the deformation of the flexible portion 44. Generally, the surface 48 will form an angle of at least 40° with respect to the mid-circumferential centerplane CP of the tire and preferably of at least 60° with respect to the mid-circumferential centerplane CP of the tire.

Figure 4:
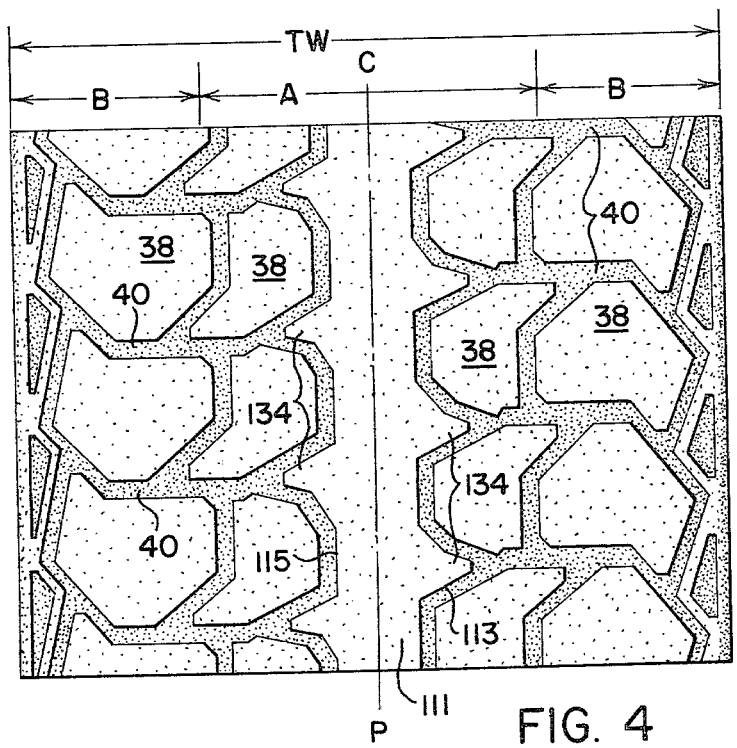
FIG. 4 is a fragmentary, enlarged front plan view of a modified form of the tread portion of a tire made according to the present invention.

Referring to FIG. 4 there is illustrated a modified form of the present invention. In this form the central portion of the tread in the area of the mid-circumferential centerplane CP is provided with a circumferentially extending rib 111. The axial sides 113,115 of the rib have a configuration so as to provide a plurality of flexible portions 134 which function in the same manner as flexible portion 34 of independent projections 38.

While certain representative embodiments and details have been shown for the purposes of illustrating the invention, it will be apparent to those skilled in the art that various changes and modifications may be made therein without departing from the spirit or scope of the invention.

We claim:

1. A pneumatic tire having a ground-engaging tread portion characterized by said tread portion having a plurality of independent projections placed about the circumference of said tire and arranged so as to provide a plurality of substantially axially extending grooves from the centerplane of the tire to the tread edge, said independent projections have a rigid portion and at least one flexible portion such that when a braking force is applied to the tire said flexible portion of said independent projections deform so as to improve water drainage from the tread portion of the tire.

2. A pneumatic radial tire having a ground-engaging tread portion; a reinforcing belt structure in said ground-engaging tread portion characterized by said tread portion comprising a plurality of independent projections, said independent projections are arranged about the circumference of said tire so as to provide a plurality of substantially axially extending grooves from the center of said tread to the tread edge, said tread portion having a circumferentially extending central portion, said central portion having a width of at least 60 percent of the tread width and extending substantially equal on both sides of the mid-circumferential centerplane of said tire, said projections in said central portion having a rigid portion and at least one flexible portion, said flexible portion having a braking surface which forms an angle of at least 40° with respect to the centerplane of the tire, said flexible portions, when the braking force is applied to the tire, deform so as to improve water drainage from the tread portion of the tire.

3. A tire according to claim 2 wherein the portion of said axially extending grooves in said central portion form an angle in the range of about 30° to 80° with respect to the mid-circumferential plane of said tire and the portion of said axially extending grooves in the portion of the tread axially outward of said central portion form an angle in the range of about 60° to 90° with respect to the mid-circumferential centerplane of said tire.

4. A tire according to claim 2 wherein said axially extending grooves in said central portion form an angle of about 45° with respect to the mid-circumferential centerplane of said tire and the portion of said axially extending grooves in the portion of the tread axially outward of said central portion form an angle of about 90° with respect to the mid-circumferential centerplane of said tire.

5. A tire according to claims 1, 2, or 3, wherein the forward engaging surface of said flexible portion form an angle of at least 40° with respect to the mid-circumferential centerplane of the tire.

6. A tire according to claims 1, 2, or 3 wherein the forward engaging surface of said flexible portion form an angle of at least 60° with respect to the mid-circumferential centerplane of the tire.

7. A tire according to claim 2 wherein the cords of the cut belt layers form an angle from about 15° to 25° with respect to the mid-circumferential centerplane of the tire.

* * * * *